INVENTOR
RALPH H. HALVORSEN
BY Emery Robinson
ATTORNEY

Nov. 8, 1949

R. H. HALVORSEN 2,487,130

SIGNALING SYSTEM

Filed June 20, 1946

INVENTOR
RALPH H. HALVORSEN
BY Emery Robinson
ATTORNEY

Nov. 8, 1949     R. H. HALVORSEN     2,487,130
SIGNALING SYSTEM
Filed June 20, 1946     4 Sheets—Sheet 4
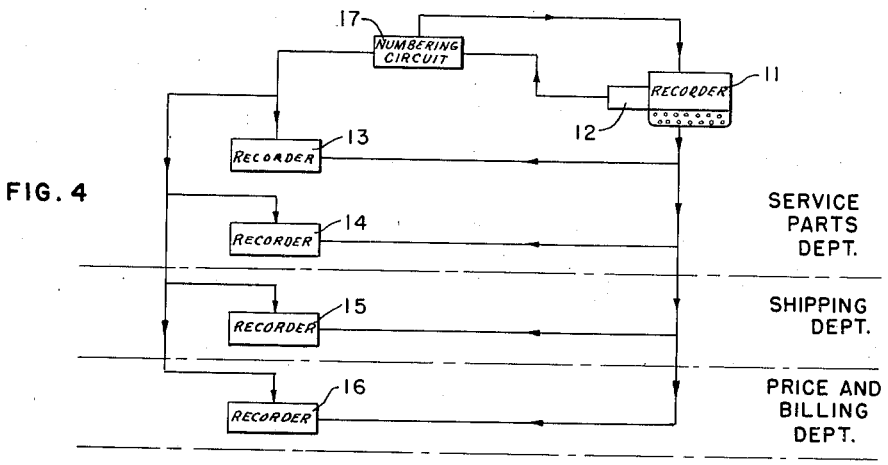
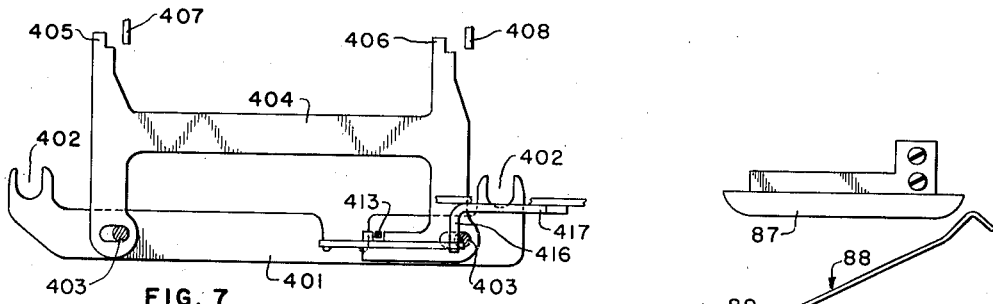
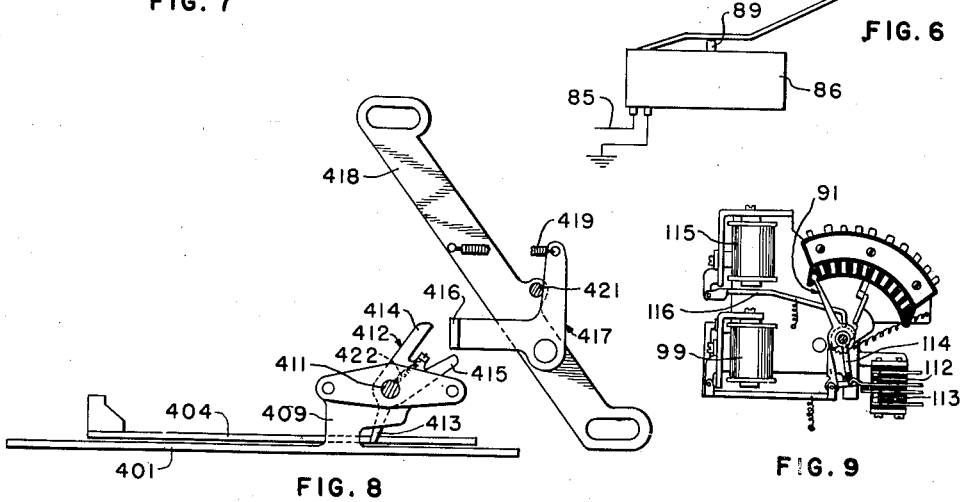
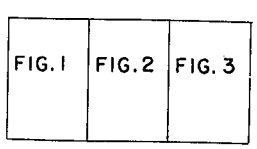
INVENTOR
RALPH H. HALVORSEN
BY Emery Robinson
ATTORNEY Patented Nov. 8, 1949

2,487,130

UNITED STATES PATENT OFFICE 2,487,130

SIGNALING SYSTEM

Ralph H. Halvorsen, Chicago, Ill., assignor to Teletype Corporation, Chicago, Ill., a corporation of Delaware Application June 20, 1946, Serial No. 678,020

6 Claims. (Cl. 178—2)

This invention relates to a system of telegraphic control of recording devices and more particularly to the use of such devices for accounting and other business applications.

The principal object of the invention is the provision of means for facilitating the preparation of accounting records telegraphically.

Another object of the invention is the provision in merchandising control systems of a numbering and control circuit effective under the control of a single key to automatically transmit a number changeable consecutively upon each key operation, and for repeating the number under certain conditions of operation.

In the system according to the present invention, telegraph printing machines are situated at various points or departments of a merchandising organization. These machines are under the control of a centrally located machine which is provided with a keyboard transmitting device and a switching control device which functions to control the transmission of messages to all or certain ones only of the other recording machines or page printers, in the present instance.

A better understanding of the foregoing objects of the present invention may be had from the following description taken in conjunction with the following drawings, in which Figs. 1, 2, and 3 are component parts of a circuit arrangement of the system according to the present invention;

Fig. 4 is a schematic diagram showing the arrangement of the recording apparatus relative to the various departments;

Fig. 5 is a view showing the relative arrangement of Figs. 1, 2, and 3;

Fig. 6 is a fragmentary view of one of the control contact arrangements in the recording apparatus, and Figs. 7 and 8 are fragmentary views showing the carriage return and line feed blocking mechanism employed in certain of the recording apparatuses in the present system.

Fig. 9 is a view showing the construction of a stepping switch such as A or H.

Figure 1:
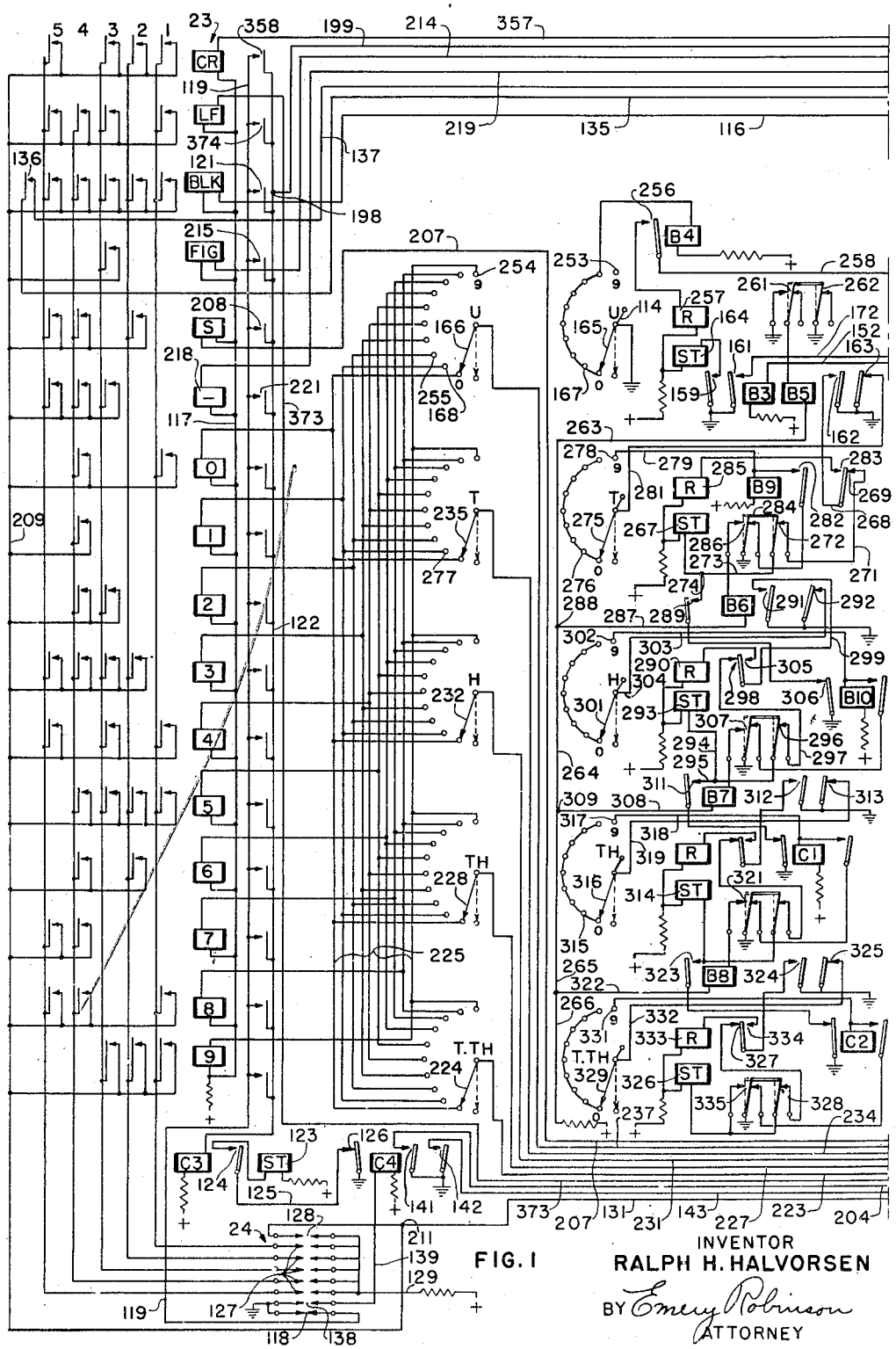

Having reference to Fig. 4, a recorder 11 is provided with a page printing mechanism and a keyboard transmitting device. Attached to the recorder 11 is a switching control device 12 which functions to control the transmission of messages to all or certain ones only of five recorders 11, 13, 14, 15, and/or 16, depending upon the setting of the control device 12. In the present embodiment of the invention, the recorders 11, 13, and 14 are located in one department, for example, the service department. The recorders 14 and 15 are called the log record printers for printing a log record consisting of the sales number, customer's number and address for the service department record, and shipping department record respectively. The recorder 13 is an item or stock requisition printer which prints upon separate forms individual items automatically. Recorder 16 is a printer unit of the receiving type only and prints all the information transmitted from the recorder 11. Associated with the recorder 11 and the control unit 12 is a numbering circuit indicated in Fig. 4 by the numeral 17. The relation of the various recording apparatuses and the numbering circuit 17 as well as the control unit 12 will become apparent from the following description.

The circuit according to the present invention is designed to perform three separate functions, namely first, as a control circuit for the purpose of controlling the transmission to a set of five printers 11, 13, 14, 15, and 16; that is, to be able to cut in or out of the line circuit one or more of the printers depending upon the position of a control key 12. Secondly, as a numbering circuit, to transmit to the printers in the system, a six digit number preceded by a letter and a dash, the number being automatically advanced for each depression of a number advance key 22. Thirdly, upon a circuit closure from a switch arrangement shown in Fig. 6, depending upon the location of the printer carriage in the control printer unit in relation to the platen, one of the printers is automatically removed from the line circuit and connected to the numbering circuit for the transmission of the current number plus carriage return and a predetermined number of line feeds in order to advance the forms used in this printer to a desired printing position. This last-mentioned printer is the stock requisition printer 14.

Figure 2:
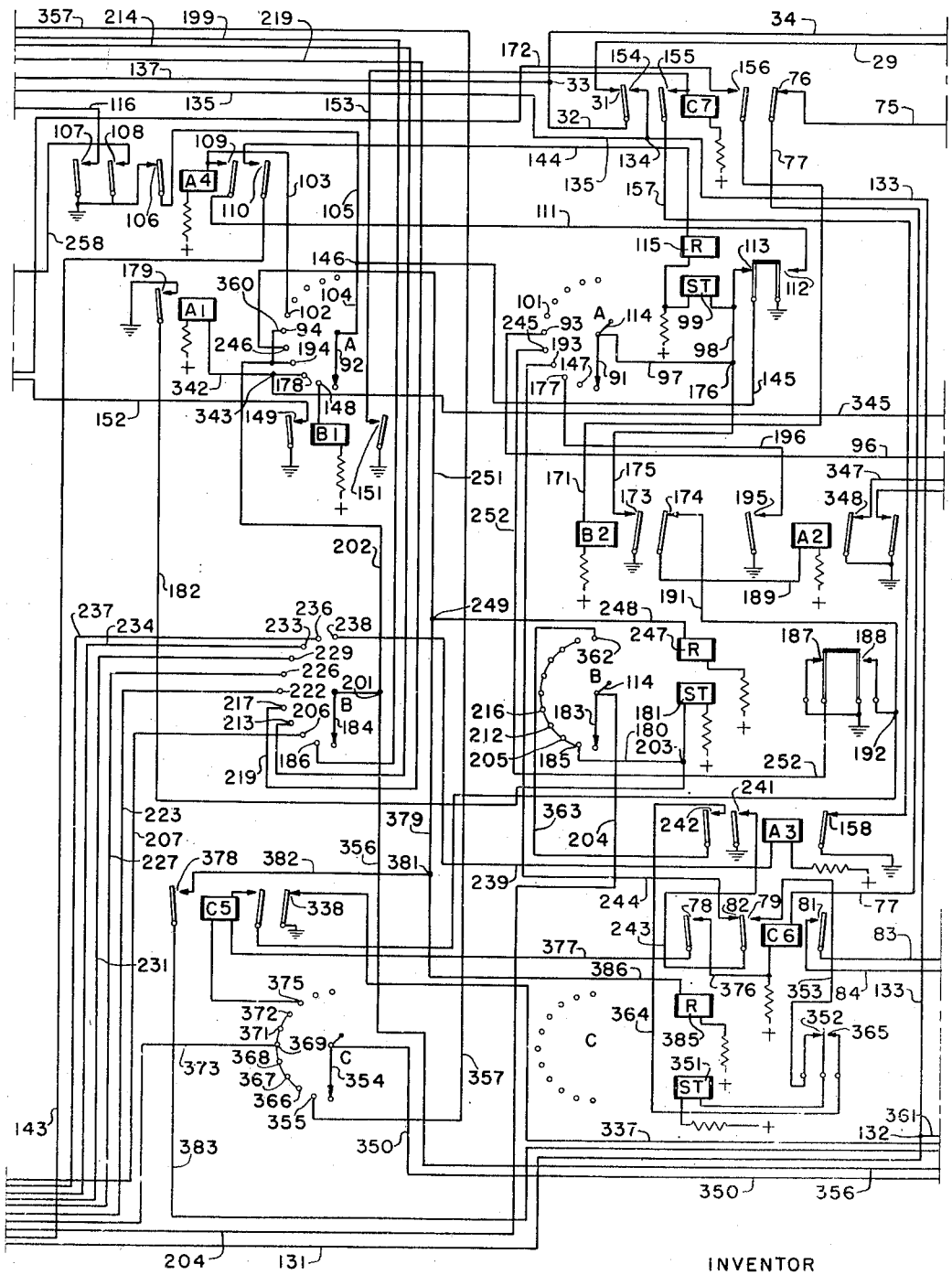

Having reference to the circuit arrangement shown in Figs. 1, 2, and 3, a set of stepping switches are employed, eight in number, distributed as follows: A stepping switch is utilized for each of the digits to be transmitted and, as shown in Fig. 1, are designated U, T, HTH, and TTH, indicative of units, tens, hundreds, thousandths, and ten thousandths, respectively. Two of the stepping switches, designated A and B in Fig. 2, are employed for controlling the sequence of transmission, and a stepping switch designated C, also shown in Fig. 2 is utilized for controlling the transmission of the carriage return and line feed signals, as will presently appear. Also shown in Fig. 1 are the code relays 23, which are sixteen in number and are used for setting up the code of the digits, letters, and functions to be transmitted. Ten of the relays 23, labeled 0 to 9, inclusive, are wired to the ten terminals of the five stepping switches designated U, T, H, TH, and TTH. The other six of the relays 23, namely, CR, LF, BLK, FIG, S, (indicative, respectively, of carriage return, line feed, blank, figures shift, and space) and dash (—), are wired to the arcs of the selectors or stepping switches A, B, and C for the transmission of characters and functions. The contacts 1 to 5 of the relays 23 are wired to the contacts of a transmitter 24 in accordance with the code of the character or function which the particular relay 23 represents. The transmitter 24 is of the type shown in U. S. Patent No. 2,296,845, issued September 29, 1942, to M. T. Goetz.

Figure 3:
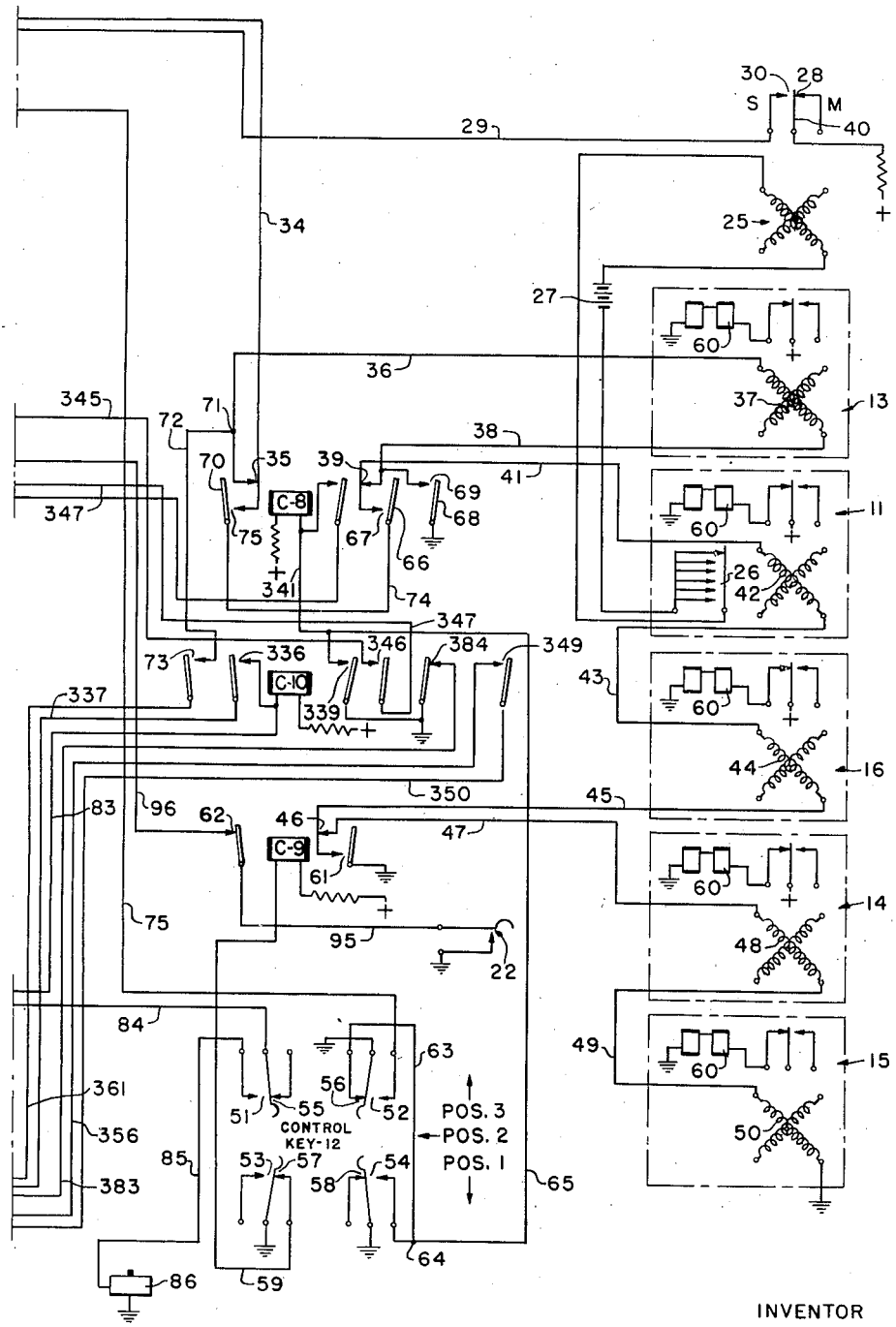

The control portion of the circuit according to the present invention is shown in Fig. 3 and comprises a line relay 25 and three control relays C8, C9, and C10. The winding of relay 25 is connected in series with the keyboard transmitter 26 over an obvious circuit including a battery 27. The relay 25 is so wired that when the circuit from battery 27 through the winding of relay 25 and through transmitting contacts 26 is closed, the relay 25 is in the marking position. In this position the marking contact 28 of relay 25 is normally closed, being opened periodically during signal transmission in a well known manner. During signaling periods, a circuit is completed from battery, through contact 30 (when closed) over conductor 29, through contact 31 (normally closed) of relay C7, then over conductor 32 to junction 33, over conductor 34, through contact 35 of make-before-break contact of relay C8, over conductor 36, through winding of line relay 37 of printer unit 13, over conductor 38 through contact 39 of make-before-break contact of relay C8, over conductor 41, through the winding of line relay 42 of recorder 11, over conductor 43, through the winding of line relay 44 of the recorder 16, over conductor 45, through contact 46 of make-before-break contact of relay C9, over conductor 47, through winding of line relay 48 of recorder 14, over conductor 49, then through the winding of line relay 50 of recorder 15 to ground. Thus, it is seen that the contact 28 of relay 25 is wired in series with the five line relays 37, 42, 44, 48, and 51 of the five printers 13, 11, 16, 14, and 15, respectively, in the circuit in such a manner that no line current is flowing through the printer line relays when the contactor 40 of the relay 25 in the control circuit is in a marking position, and in order to keep the holding magnets 60 of the printers or recorders 13, 11, 16, 14, and 15 operated when the transmitter contacts 26 of the control printer 13 are closed, the marking and spacing contacts of the five recorder line relays 37, 42, 44, 48, and 50 are reversed so that the holding magnets 60 are held in an operated position when no line current is flowing in the printer line relay circuit. This method of wiring the line circuit is used to eliminate trouble due to opening of the line when switching printers in and out of the system. As will appear hereinafter, the three relays C8, C9, and C10 operate in various positions of the control key 12 for the purpose of switching the recorders 13, 11, 16, 14, and 15 into and out of the line circuit.

The control key 12 is a three position control key or switch, and is shown in Fig. 3 in position No. 2, wherein its contacts 51, 52, 53, and 54 are open and its contacts 55, 56, 57, and 58 are closed. The control key 12 is employed for controlling the transmission to the line relays 37, 42, 44, 48, and 50 of recorders 11 and 13 to 16. In position No. 2 as shown, a circuit is closed from ground, through contact 57, over conductor 59, and through the winding of relay C9 to battery. Relay C9 thereupon operates to close its contact 61 of make-before-break contact and open its contacts 46 and 62, the effect of which will presently appear. With control key 12 in its position No. 2 (as shown) a circuit is completed from ground, through contact 56, over conductor 63, to juncture 64, then over conductor 65 and through the winding of relay C8 to battery, to thereupon operate said relay C8. Relays C9 and C8 remain operated as long as the control key 12 is in the position No. 2.

With the control relay C9 in its operated position, the circuit from the winding of line relay 44 to line relay 48 is opened, and ground is supplied to conductor 45 through contact 61, thereby disconnecting the recorders 14 and 15 from the line circuit. With relay C8 in its operated position over the circuit previously described, the line relay 37 of printer 13 is removed from the line circuit because contacts 35 and 39 have been opened by the attraction of armatures 70 and 66 of relay C8 thereby effecting the closing of contacts 75 and 67 and opening of contacts 35 and 39. The attraction of armature 68 has caused the closing of contact 69. With relay C8 energized and the circuit to recorders 13, 14 and 15 broken, the circuit for relay 37 over conductor 36 through junction 71 and over conductor 72 will not be completed since the contact 73 of relay C10 is still open.

With relays C8 and C9 in their operated condition, the line circuit is closed from ground at the contact 61 of relay C9, over the conductor 45, through the winding of relay 44, over conductor 43, through the winding of relay 42, over the conductor 41, through contact 67, over conductor 74, through contact 75, over conductor 34, over conductor 32, through contact 31 of relay C7, over conductor 29, then through contact 28 (when closed) to positive battery. From the foregoing it is observed that with the control key 12 in its position No. 2 as described above, printers or recorders 11 and 16 only are connected to the line circuit.

When the control key 12 is operated to its position No. 1 its contacts 53 and 54 are closed, and its contacts 57 and 58 are opened. In this position, the ground for relay C8 is derived through contact 54 thereby maintaining the relay C8 operated. Upon the opening of contact 57 the relay C9 becomes de-energized over the circuit including conductor 59. Thereupon contact 62 closes and contact 61 of the make-before-break contact opens while contact 46 again closes. Since relay C8 is still energized, the printer 13 is still disconnected from the line circuit, and printers 11, 16, 14, and 15 are connected in series in the line circuit traced from ground through relay winding 50, over conductor 49, through relay 48, over conductors 47, through contact 46, over conductor 45, through relay 44, over conductor 43, through relay 42, over conductor 41, through contact 67, over conductor 74, through contact 75 over conductors 34 and 32, through contact 31, over conductor 29, through contact 28 (whenever closed) to battery.

When the control key 12 is operated to its position No. 3 its contacts 51 and 52 will be closed and its contacts 55 and 56 will be opened. Relay C9 will again become operated over the circuit from ground through contact 57, over conductor 59 through the winding of relay C9 to battery, thereby opening contact 62, and closing contact 61 and opening contact 46 of the make-before-break contact. The printers 14 and 15 are thereby disconnected from the line due to the opening of contact 46. Upon the closing of contact 61 ground is supplied again over conductor 45 to the line relay 44. Relay C8 also became de-energized upon the operation of the control key 12 to its position No. 3. No ground is supplied to relay C8 either through contact 56 or contact 54, which contacts are both now opened. In view of this, the armatures of relay C8 will be released and contacts 35 and 39 will again become closed and accordingly will be included in the line circuit. The recorders 11, 13, and 16 are now connected in the line circuit from ground, through contact 61, over conductor 45, through relay 44, over conductor 43, through relay 42, over conductor 41, through contact 39, over conductor 38, through relay 37, over conductor 36, through contact 35, over conductors 34 and 32, through contact 31, over conductor 29, and through contact 28 (when closed) to battery.

With the control key 12 still in position No. 3, a circuit is completed for relay C6 from ground, through the contact 52 (now closed), over conductor 75, through contact 76 (now closed) of relay C7, over conductor 77, and through the winding of relay C6 to battery. In response to the energization of relay C6 its contacts 78, 79, and 81, become closed and its contact 82 is opened. Upon the closure of contact 81 a circuit is completed from battery, through the winding of relay C10, over the conductor 83, through contact 81 (now closed) of relay C6, over conductor 84, through contact 51 of control key 12 (now closed), over conductor 85, and through the contact 86 (which is closed in a manner as will hereinafter appear), to ground. Relay C10 does not operate at this time however since the contact 86 is not yet closed.

Having reference to Fig. 6, there is shown a contact arrangement which is mounted into the recorder unit 11, which is of the type shown in U. S. Patent 1,904,164 issued to S. Morton et al. In this printing device or recorder the shoe 87 is mounted suitably on the movable type carriage and is adapted to cooperate with a spring member 88 at a predetermined point in its path of travel (preferably near the end of the line of printing). Spring member 88 is a part of a contact member 86 which is of a commercial type and operates in such a manner that when the spring 88 is biased in a clockwise manner, as viewed in Fig. 6 a contact button 89 is depressed to close the circuit through this contact member 86, thus completing a circuit from ground, through the contact member 86 and over the conductor 85, as previously traced in connection with Figs. 2 and 3, to energize relay C10.

In the following description the operation of the numbering circuit shown in Figs. 1 and 2, which is under the control of the circuit shown in Fig. 3 and which is utilized for the automatic transmission of consecutive numbers, will be described. Preparatory to the transmission of a number through the numbering circuit, the control key 12 is placed in position No. 1 and the control switch A will be found with its contact arms 91 and 92 in contact with contact elements 93 and 94. As will be observed hereinafter, the normal stop position or rest position of switch A would be with the contact arms 91 and 92 upon contacts 93 and 94, respectively.

With the system in the condition just described, the number advance key 22 is operated to close its contacts, thereby completing a circuit from ground through contact 22, over conductor 95, through contact 62, over conductor 96, through contact 93 of the right-hand arc of switch A, over contact arm 91, over conductors 97 and 98 and through the winding of stepping magnet 99 to battery. Accordingly, the arm 91 of switch A, as well as arm 92, are stepped to segments 101 and 102, respectively. With switch A in this position a circuit is completed from battery, through the winding of relay A4, over conductor 103, through contact 102, over contact arm 92, over conductors 104 and 105, through contact 106 (now closed), to ground, thereby energizing relay A4, as a result of which contact 106 opens and contacts 107, 108, 109, 110 close. Upon the closure of contact 109 a locking circuit is provided for relay A4 from battery, through the winding of relay A4, through contact 109, over conductor 111, and through the contact 112 of switch A to ground. Contacts 112 and 113 of switch A are a pair of contacts which are operated by an extension 114 of the switch arm 91, Fig. 9.

The switches A, B, C, and the digit switches U, T, H, TH, and TTH are of the type shown in Fig. 9 wherein the switch contacts, for example, contacts 112 and 113 of switch A are shown as controlled by the contact arm 91 through the instrumentality of extension 114, which in the zero or home position, as shown, holds the contacts 112 and 113 in one condition of operation. Through the energization of the stepping magnet 99, the arm 91 will be rotated and upon the rotation to the first of the stepping contacts, the contacts 112 and 113 will be changed in their condition of operation. A restoring magnet 115 operates the detent lever 116 to permit the index arm 91 to be returned to its home position.

Upon the energization of relay A4 a circuit is completed for the energization of the BLK relay (of the set of relays 23) from ground, through contact 107 (now closed) of relay A4, over conductor 116, through the winding of the BLK relay, then over bus conductor 117 to battery. With the BLK relay operated, a circuit is completed from ground, through the transmitter contact 118 (normally closed), over the conductor 119, through the contact 121 of relay BLK (now closed), over conductor 122 and through the winding of relay C3 to battery. Upon the energization of relay C3, an energizing circuit for the transmitter start magnet 123 is completed from battery, through the winding of start magnet 123, through the contact 124 (now closed) of relay C3, over conductor 125, through contact 126 of relay C4, to ground. Upon the energization of the start magnet 123, the distributor 24 is initiated into rotation so that its series of contacts are closed in a predetermined sequence under the control of cams as is well known in the art.

The contacts 1 to 5, inclusive, of the BLK relay are connected to contacts 127 of the transmitter 24. As the transmitter 24 begins to transmit, its start contact 128 closes, thus completing a circuit from battery over conductor 129, through contact 128, over conductor 131 to junction 132 (Fig. 2), then over conductor 133 to junction 134, then over conductor 135 to and through contact 136

(now closed) of the BLK relay, then over conductor 137 to junction 33 (Fig. 2), then over conductor 34, through contact 75 (Fig. 3), over conductor 74, through contact 67 (now closed), then over conductor 41, through winding of relay 42, over conductor 43, through relay 44, over conductor 45, through contact 46, over conductor 47, through winding of relay 48, over conductor 49, to winding 50 and to ground, thereby operating the printers 11, 16, 14, and 15.

As battery is connected to all five make contacts of relay BLK, impulses 1 to 5 are transmitted, operating the printer line relays 42, 44, 48, and 50 for each impulse, resulting in a blank signal being received by the printer, since the marking and spacing contacts of these printer line relays are reversed, as previously described. This blank signal is transmitted for the reason that one of the printers in the circuit is arranged for carriage return and line feed functions on blank signals, and in the event the carriage has not returned, the blank signal will return the carriage before a number is transmitted. The necessity for this arrangement is that, through the instrumentality of a special mechanism, this particular printer is arranged to disregard carriage return and line feed signals during the reception of the first 52 characters so that when information is being printed on the control printer in a block consisting of short lines such as an address, this same information will appear on one or two lines on the form being printed on this printer. This feature is included to conserve paper, as this printer records only a log record and no other information than the number transmitted by the numbering circuit and the address typed on the control printer is required for this record.

At the completion of the transmitter cycle for transmitting the blank signal just set up, the contact 138 in transmitter 24 is closed which completes a circuit for operating relay C4 (Fig. 1) from ground, through contact 138 (now closed), over conductor 139 and through the winding of relay C4 to battery. Upon energization, relay C4 opens its contact 126 to break the energizing circuit for the start relay 123. Also, contacts 141 and 142 of relay C4 are now closed.

During the operation of relay C4, a circuit is completed from ground, through the contact 142 (now closed), over conductor 143, through contact 110 (now closed) of relay A4, then over conductor 144 through the winding of magnet 115 to battery. Since this is the restoring magnet for switch A, the switch A is returned to its normal position with the arms 91 and 92 in the position shown in Fig. 2. The effect of closing contact 141 of relay C4 will be described hereinafter.

When switch A returns to its normal position its contact 112 will be opened by arm 114 in a manner previously described, thereby opening the locking circuit for relay A4, which releases. Upon the closure of contacts 113 of switch A, its starting magnet 99 will be operated over a circuit extending from battery, through the winding of magnet 99, through contact 113, over conductor 145 to junction 146, then over conductor 105, through contact 106 (now closed), to ground, thereby advancing the arm 91 of switch A to its terminal 147. Also, switch arm 92 of switch A is advanced to terminal 148.

With switch A in this position, a circuit is completed for the energization of relay B1 extending from battery, through the winding of relay B1, through contact 148, over switch arm 92, over conductors 104 and 105, through contact 106, to ground. When relay B1 operates, its contacts 149 and 151 are closed. Upon the closing of contact 149 a circuit is completed for relay B3 from ground, through contact 149, over conductor 152, through the winding of relay B3 to battery. A circuit is also completed for the relay C7 from ground, through contact 151, over conductor 153, and through the winding of relay C7 to battery. When relay C7 becomes operated its contacts 31 and 76 are opened, and its contacts 154, 155, and 156 become closed. When contact 155 closes, a locking circuit for relay C7 is completed from battery, through the winding of relay C7 through contact 155 (now closed), over conductor 157 and through contact 158 of relay A3 to ground.

When the relay B3 is thus energized it closes its contacts 159 and 161. The closure of contact 159 completes a circuit for start magnet 164 of switch U to step the switch arms 165 and 166 thereof one step to the contacts 167 and 168, respectively. Contacts 167 and 168 are indicative of the No. 1 position or the digit 1 position of the U switch; the U switch being the unit switch of the numbering system. A characteristic of the switches U, T, H, TH, and TTH is that the switch arms all return to the dotted line position shown and are immediately stepped to the zero position automatically. Such operation will be more fully described hereinafter after the switch arms have been advanced to the No. 9 position.

When the relay B3 has become operated it closes its contacts 161 to complete a circuit for relay B2 extending from battery, through the winding of relay B2 (Fig. 2), over conductor 171, through contacts 156 (now closed) of relay C7, over conductor 172, through contact 161 (now closed) to ground. Relay B2 upon operating closes its contact 173 and opens its contact 174. Upon the closing of contact 173 a circuit is completed from ground through contact 173 (now closed), over conductor 175 to junction 176, then over conductor 98 and through the winding of stepping magnet 99 to battery, thereby stepping the switch arms 91 and 92 of switch A to the next contacts 177 and 178, respectively. Relay B1 becomes de-energized upon the breaking of its energizing circuit at contact 148. Relay B3 becomes de-energized upon the opening of contact 149 of relay B1. Relay B2 becomes de-energized upon the opening of contact 161 of relay B3. Thus it is seen that when the switch arms 91 and 92 of switch A are stepped onto contacts 177 and 178 respectively, the relays B1, B2, and B3, previously energized, are now released or de-energized.

With the switch A in the condition where its switch arm 92 rests upon contact 178 an energizing circuit is completed for relay A1. This circuit extends from battery, through the winding of relay A1, through contact 178, over switch arm 92, over conductors 104 and 105, through contacts 106 (now closed) of relay A4 (now de-energized), then to ground. Relay A1 upon becoming energized closes its contacts 179 to complete a circuit for the stepping magnet 181 of switch B from ground, through the contact 179 (now closed) of relay A1, over conductor 182, through the winding of relay 184 to battery. Switch B upon operating moves or steps its arms 183 and 184 to contacts 185 and 186, respectively. Moreover, while the switch B has advanced its arm 183 to the contact 185, its extension 114 will operate to open contact 187 and close contact 188, which contacts are similar to the contact 112 and 113 shown in Fig. 9. Upon the closing of contact 188 a circuit is completed for relay A2 extending from battery through the winding of relay A2, over conductor 189, through contact 174 (now closed), over conductor 191 to junction 192, then through contact 188 (now closed), to ground. Relay A2, upon operating, causes the switch A to be stepped to bring its arms 91 and 92 into contact with contacts 193 and 194, respectively. This stepping circuit extends from ground, through contact 195 (now closed) of relay A2, over conductor 196, through contact 177, over switch arm 91, over conductors 97 and 98, then through the winding of magnet 99 to battery. Upon being energized, the stepping magnet 99 causes the arms 91 and 92 to be stepped to their next contacts 193 and 194, respectively.

With the circuit in this condition, the relay C3 (associated with transmitter 24, Fig. 1) again becomes energized over a circuit extending from battery, through the winding of relay C3, over conductor 122 to junction 198, then over conductor 199 to contact 186 of switch B (Fig. 2), then over switch arm 184 to junction 201, then over conductor 202 to contact 194 of switch A, then over switch arm 92, over conductors 104 and 105, through contact 106 (now closed) of relay A4, to ground.

Relay C3 when operated will again operate the clutch start magnet 123 of transmitter 24, as previously described. However, no current is furnished to transmitter contacts 1 to 5, and therefore, the line relays of the various printers in the circuit will not operate. The holding magnet 60 of the printers 11, 14, and 15 will remain operated, thereby resulting in five marking signals being received which are equivalent to the letters or "LTRS" signal, due to the reversal of signal impulses, as previously described. At the close of the transmitter cycle, the transmitter contact 138 will again close, thereby operating the relay C4. Relay C4, when operated, will operate the stepper magnet 181 of switch B over a circuit extending from battery, through the winding of stepping magnet 181 to junction 203, then through contact 185 of switch B, over switch arm 183, over conductor 204, through contact 141 (now closed) of relay C4, to ground. In response to this operation of the stepping magnet 181, the switch arms 183 and 184 of switch B will be advanced to their contacts 205 and 206, respectively.

With the switch arm 184 of switch B on the contact 206, a circuit is completed for code relay S (of the set of relays 23) from battery over conductor 117 (Fig. 1), through the winding of code relay S, over the conductor 207, through contact 206, over arm 184 to junction 201, then over conductor 202 to the contact 194 of switch A, then over switch arm 92, over conductors 104 and 105, through the contact 106 (now closed), to ground. As the code relay S becomes operated its contact 208 closes to complete a circuit for relay C3 from battery, through the winding of relay C3 over conductor 122, through the contact 208 (now closed), then over conductor 119, and through normally closed contact 118 to ground. When relay C3 is operated it will again initiate operation of the clutch start magnet 123, thereby starting the transmitter and causing it to transmit the code set up by the contacts of the code relay S; namely, the contacts 2, 4, and 5 will be closed, whereupon a code signal will be transmitted over the line to the printers 11, 14, 15, and 16. For example, the transmitting circuit will extend from battery over conductor 129, through the contacts 127, over the conductors associated therewith and through the contacts 2, 4, and 5 of code relay S, over conductor 209 to junction 211, then over conductor 131 to junction 132 (Fig. 2), then over conductor 133 to junction 134, then through contacts 154 (now closed), over conductors 32 and 34, through contact 75 (now closed), over conductor 74, through contact 67 (now closed), over conductor 41, then through the printers 11, 14, 15, and 16 to ground.

At the close of this transmitting cycle (for the code signal S) the contact 138 of transmitter 24 (Fig. 1) will again close completing a circuit for the relay C4 (associated with transmitter 24) which when operated closes its contact 141 to again complete a circuit to the stepping magnet 181 of switch B from ground, through the contact 141 (now closed), over conductor 204, over the switch arm 183, through contact 205, over conductor 180 to junction 203, then through the winding of magnet 181 to battery. The operation of the stepping magnet 181 will cause the switch arms 183 and 184 to be stepped to contacts 212 and 213, respectively, of switch B.

With the switch B in the position wherein its switch arm 184 is resting upon contact 213, a code signal corresponding to the "Fig." code signal (figures shift or upper case) will be transmitted to the printers 11, 14, 15, and 16. To achieve this result the Fig. code relay of the set of relays 23 will become energized over a circuit extending from battery, over conductor 117 (Fig. 1), through the winding of Fig. relay, over conductor 214 to contact 213 of switch B, over switch arm 184 to junction 201, then over conductor 202 to contact 194 of switch A, over switch arm 92, over conductors 104 and 105, then through contact 106 (now closed) of relay A4, to ground. Relay Fig., upon operating, causes its contact 215 to close to complete a circuit for the relay C3 which, when operated as previously described, will cause the start magnet 123 to operate to thereby initiate transmission of the figures (Fig.) code signal, over the conductor 209 from the contact 3 of the Fig. code relay, then over conductors 131 and 133, through contact 154, over conductors 32 and 34, through the contacts 75 and 67 of the C8 relay (now energized) then through the printers 11, 16, 14, and 15, to ground. As previously described, the contact 138 of transmitter 24 again operates in this transmitting cycle to energize the relay C4 which closes its contact 141 to cause the stepping magnet 181 of the switch B to again be operated to advance the switch arms 183 and 184 to contacts 216 and 217, respectively.

With the switch B in the position wherein its switch arm 184 is in contact with the contact 217, a dash (—) signal will be transmitted due to the fact that the dash (—) code relay 218 of the set of relays 23 will become energized over a circuit extending from battery, over conductor 117, through the winding of dash (—) relay 218, over conductor 219, through contact 217, over the switch arm 184 to junction 201, over conductor 202, through contact 194 of switch A, over switch arm 92, over conductors 104 and 105, through contact 106, to ground. As previously described, the relay C3 will again become operated since the contacts 221 of relay 218 have become closed, whereupon the start magnet 123 will operate to initiate rotation of the transmitter 24 to transmit a signal comprising marking impulses in the "3," "4," and "5" positions, indicative of the dash (—) signal, over conductor 209, conductors 131 and 133, through contact 154 (still closed) of relay C7, and contacts 75 and 67 (still closed) of relay C8, to the printers 11, 16, 14, and 15. Relay C4 will again become operated upon the closure of contact 138 to effect the closure of its contact 141 to thereby step the switch B to bring the switch arm 184 to the position of contact 222 (arm 183 moving correspondingly).

With the switch B in the position wherein its switch arm 184 is in contact with the contact 222, the circuit for operating the code relays 23 now extends from ground, through contact 106 (now closed) of relay A4, over conductors 105 and 104, through switch arm 92 of switch A, through contact 194, over conductor 202, to junction 201, then over switch arm 184 and through contact 222, over conductor 223 to switch arm 224 of numbering switch TTH, then over any one of the conductors 225 to one of the code relays 0 to 9 (of the set of relays 23) depending upon the position of the TTH switch arm 224, as will clearly appear hereinafter. Incidentally, with one of the numerical code relays 23, namely 0 to 9, operated, the circuit therefor will function as previously described, wherein the relay C3 is operated to initiate the start magnet 123 to cause the transmitter 24 to transmit the particular code signal for the number set up.

Accordingly, for each cycle of the transmitter cam shaft 24, the relay C4 will operate to advance the switch B one step over the energizing circuit for the stepping magnet 181, as previously described. Therefore, the switch B will be stepped from its contact 222 to its contact 226 whereby a circuit will be completed from ground, through contact 106 (now closed) of relay A4, over conductors 105 and 104, then through switch arm 92 of switch A, then through contact 194, over conductor 202 to junction 201, then over switch arm 184 of switch B to contact 226, then over conductor 227, to the switch arm 228 of the numerical switch TH, wherefrom the circuit will extend over the associated conductors 225 to whichever of the numerical code relays 23 is to be energized. The relay C3 will again be energized to transmit the code signal over the transmitter 24 whereupon the relay C4 will again become energized to cause the switch B to be stepped one more step, to bring the switch arm 184 of switch B into contact with contact 229.

A circuit will again be completed from ground through contact 106 and through switch A and contact 229 of switch B, through the conductor 231 to the switch arm 232 of switch H, then to code relays 0 to 9. With the switch B set to bring its switch arm 184 into contact with contact 233, the circuit previously described as originating through contacts 106 will be completed over conductor 234 to switch arm 235 of numbering switch T. Finally when the switch B is advanced to the contact 236, the aforedescribed circuit will be completed over conductor 237 to switch arm 166 of the numbering switch U. It is understood, therefore, that each time the numbering switch is operated, a code relay 23 will be energized depending upon the position of the various numbering switch arms 224, 228, 232, 235, and 166.

At the completion of the transmission of the units digit through the switch U, and when the relay C4 again operates, as previously described, the switch B will advance its arm 184 to contact 238, in which position a circuit is completed from ground, through contact 106 (still closed) of relay A4 over conductors 105 and 104, through the switch arm 92 of switch A, through contact 194 with which switch arm 92 is still in contact, over conductor 202 to the junction 201, over switch arm 184 and through contact 238, then over conductor 239 and through the winding of relay A3 to battery. Relay A3 thus becomes energized and opens its contact 158 and closes its contacts 241 and 242. The opening of contact 158 breaks the locking circuit, previously traced, for the relay C7, thus causing the relay C7 to become de-energized.

The closing of contact 241 of relay A3 causes a circuit to be completed for the operation of the stepping magnet 99 of switch A extending from ground, through the contact 241 (now closed), over conductor 243, through contact 82 (now closed) of relay C6, over conductor 244, through contact 193, over switch arm 91, over conductors 97 and 98, and then through the winding of magnet 99 to battery, thereby stepping the switch A to bring its contact arms 91 and 92 into contact with contacts 245 and 246, respectively.

With the switch arm 92 in contact with contact 246 of switch A, an energizing circuit is completed for the restoring magnet 247 of switch B extending from battery, through the winding of magnet 247, over conductor 248 to junction 249, then over conductor 251 to contact 246 of switch A, then over switch arm 92, over conductors 104 and 105, through contact 106 (still closed) of relay A4, to ground. Magnet 247 which is comparable to magnet 115 of the switch shown in Fig. 9 operates to restore the switch arms 183 and 184 of switch B to their position as shown in Fig. 2. When the switch arms 183 and 184 have been restored to normal the contact 187 is closed by the extension 114 and the contact 188 is opened. The closing of contact 187 completes an energizing circuit for the stepping magnet 99 of switch A which extends from ground, through the contact 187 (now closed), over conductor 252, through contact 245, over switch arm 91, through conductors 97 and 98, then through the winding of magnet 99 to battery. The switch A is then stepped to bring its contact arms 91 and 92 again into contact with the previously mentioned contacts 93 and 94, respectively. This completes the transmission of a five digit number preceded by the letter S. The circuit remains in this position until a number again is transmitted upon the depression of the number advance key 22, whereupon the circuit will function as described hereinbefore until the unit switch reaches its terminals 253 and 254.

In the foregoing description, the switch arms 224, 228, 232, 235, and 166 have been assumed to be positioned in their zero positions, as shown in Fig. 1, so that as the switch B was stepped as previously described the BLK (blank) signal, S signal, Fig. signal, and dash (—) signal and a series of zero signals indicating the number where transmitted. Then, each time the number advancing key 22 is operated the U switch was advanced one step for each operation of the number advancing key. Thus, when the number advancing key 22 was depressed for the first time hereinbefore mentioned, the number S—00001 was transmitted to the printers 11, 14, 15, and 16. Then, upon the next depression of the number advancing key 22 the switch arms 166 of the U switch were advanced to contact 255, whereupon the number S—00002 was transmitted.

It will be recalled that each time the number advancing key 22 is depressed the relay B3 becomes energized in a manner previously described to close its contact 159 to complete a circuit for the stepping magnet 164 thereby stepping the U switch to the next contact. Thus, the U switch is stepped progressively until the position 9 is reached and the contact arm 165 engages contact 253. Responsive to this condition the circuit for the relay B4 is broken thereby releasing its armature to close its contact 256. It will be noted that the relay B4 is held operated in all the positions of the U switch except the position 9 whereat the switch arm is in engagement with the contact 253. Thus, with the relay B4 in its de-energized condition a circuit is prepared for operating the return or restoring magnet 257 of the U switch which will occur when the relay A4 again operates or becomes energized.

Therefore, when the number advance key 22 is again depressed, as described hereinbefore, the switch A will be operated to cause its switch arm 92 to be advanced to and engage the contacts 102 to thereby complete a circuit for the relay A4 from battery, through the winding of relay A4, over conductor 103, through contact 102, over switch arm 92, over conductors 104 and 105, through the contact 106, to ground. Relay A4 energizes thereby closing contact 108 thereof to complete the energizing circuit for the restoring magnet 257. The circuit for the restoring magnet 257 extends from positive battery, through the winding of magnet 257, through contact 256, over conductor 258, through contact 108 to ground. As described hereinbefore, the switch arm 165 is returned first to the dotted line position and then is automatically stepped to the zero position in response to the next operation of relay B3.

Upon the return of the switch 165 to the dotted line position the contact 261 is closed momentarily and the contact 262 is opened. Contacts 261 and 262 correspond to contacts 112 and 113 in Fig. 9, and the arm or switch arm 165 is provided with an extension similar to extension 114 for effecting the operation of said contacts 261 and 262. When the contact 261 is thus closed a circuit is completed for energizing relay B5 extending from ground, through contact 261 (now closed), then through the winding of relay B5, over conductors 263, 264, 265 and 266 to battery. The energization of relay B5 causes contact 162 to close and contact 163 to open. Contact 162 when closed completes a circuit for energizing the stepping magnet 267 of the T switch from ground, through contact 162 (now closed), over conductor 268, through contact 269, over conductor 271, through contact 272, over conductor 273 to junction 274, then through the winding of the stepping magnet 267 to battery. Thus, the arm 275 of the T switch is advanced to engage contact 276. Likewise contact switch 235 of the T switch is advanced one step to engage contact 277. With the T switch set in this manner the code relay 1 of the set of relays 23 is adapted or conditioned to send the digit signal for numeral 1 in the tens position.

Each time the numbering advance key 22 is operated the relay B3 will be energized to effect the closing of the stepping magnet 164 to step the contact arm or switch arm 165 of the U switch, one step for each operation of key 22. Then as each time the U switch arm 165 reaches contact 253 the restoration magnet 257 is operated to restore the contact arm 165, and operate relay B5, as previously described, to step the contact arm 275 of the T switch to the next contact. Thus the switch arm 275 of the T switch is stepped once each time the U switch contact arm 165 returns to its zero or neutral position operating relay B5, until the switch arm 275 of the T switch engages its contact 278. When this occurs a circuit is completed for relay B9 from battery, through the winding of relay B9, over conductor 279, through contact 278, over switch arm 275 of switch T, over conductor 281 and through contact 163 (now closed), to ground. When relay B9 is energized it closes its contacts 282 and 283 and opens contact 269. Relay B9 will become locked up over a circuit extending from battery, through the winding of relay B9, through contact 282 (now closed), and through contact 284 to ground. Contacts 272 and 284 are controlled by the switch arm 275 in the manner that contacts 112 and 113 are controlled by the switch arm 91 shown in Fig. 9.

When the switch arm 165 of the U switch reaches contact 253 to effect the restoration of the switch arm 165 to the dotted line position, the relay B5 again becomes energized as previously described upon the closure of contact 261. In response thereto contact 162 closes to complete an energizing circuit for the return magnet 285 of the T switch over a circuit extending from battery, through the winding of magnet 285, through contact 283, over conductor 268, through contact 162 to ground. When the switch arm 275 of the T switch is returned to its dotted line position the contacts 284 and 272 are opened in the manner characteristic of the switch shown in Fig. 9, whereby the opening of contact 284 causes the locking circuit of the relay B9 to be broken.

When the switch arm 275 thus returns to its dotted line position it closes contact 286 to complete an energizing circuit for relay B6 from ground, through the contact 286, through the winding of relay B6, over conductor 287 to junction 288, then over conductors 264, 265 and 266 to battery. The relay B6, when energized, closes its contacts 289 and 291 and opens its contact 292. Relay B6, upon operating, completes an energizing circuit for the stepping magnet 293 of the H switch from battery, through the winding of magnet 293, over conductors 294 and 295, through contact 296, over conductor 297, through contact 298, over conductor 299 and through contact 291 (now closed) of relay B6, to ground.

It is thus observed that each time the switch arm 275 of switch T engages contact 278 and is automatically returned to its dotted line position, thereby closing contact 286, the relay B6 is operated to close its contact 291 to complete the aforedescribed energizing circuit for stepping magnet 293 of switch H. Then, as switch H is advanced step-by-step, the switch arm 301 thereof eventually engages contact 302 to complete a circuit for operating relay B10 from battery, through the winding of relay B10, over conductor 303, through contact 302, over switch arm 301, over conductor 304, through contact 292, to ground. Relay B10, upon operating, closes its contact 305 and opens its contacts 293 and 306. Then, when relay B6 again operates due to restoration of switch arm 275 to its dotted line position a circuit will be closed to complete the energizing circuit for the return magnet 290 of switch H in the same manner as previously described for return magnet 285 of switch T, As switch arm 301 returns to its dotted line position, whereat it closes its contact 307, relay B7 becomes energized over a circuit extending from ground, through contact 307, through the winding of relay B7, over conductor 308 to junction 309, then over conductors 265 and 266 to battery. Relay B7, upon operating, closes its contacts 311 and 312 and opens contact 313. Contact 312, upon closing, completes a circuit for operating the stepping magnet 314 of the switch TH, thus stepping the switch TH to its contact 315.

Thus, each time the relay B7 operates upon the restoration of switch arm 301, the switch TH will be stepped until its switch arm 316 reaches contact 317, whereupon the relay C1 will become energized over a circuit extending from battery through the winding of relay C1, over conductor 318, through contact 317, over the switch arm 316, over conductor 319, and through contact 313 of relay B7 to ground. Switch arm 316 upon returning to its dotted line position closes contact 321 to cause the energization of relay B8 over a circuit extending from ground, through contact 321 (now closed), then through the winding of relay B8, over conductor 322 and then over conductor 266 to battery.

Relay B8 upon energizing closes its contacts 323 and 324 and opens its contact 325. Upon the closing of contact 324 a circuit is completed for operating the stepping magnet 326 of the switch TTH, extending from ground through contact 324 (now closed), through contact 327, through contact 328, then through the winding of magnet 326 to battery. In this manner, each time the relay B8 operates upon the restoration of switch arm 316, the switch TTH will be stepped until its switch arm 329 reaches contact 331, thereby completing a circuit for energizing relay C2 from battery, through the winding of relay C2, through the contact 331, over switch arm 329, over conductor 332, and through contact 325 of relay B8 to ground. A circuit is completed for the restoration magnet 333 of switch TTH from battery, through the winding of relay magnet 333, through contact 334 of relay C2 (now closed), then through contact 324 of relay B8 to ground. The switch arm 329 upon being restored to its dotted line position closes the contact 335 to complete an energizing circuit for the stepping magnet 326 from ground, through contact 335 then through the winding of magnet 326 to battery, thereby stepping the switch arm 329 to the position shown in Fig. 1.

In the foregoing description, the control key 12 was operated to position No. 1 to condition the circuit, shown in Figs. 1, 2, and 3, for transmitting a number automatically upon each operation of the number advancing key 22.

A feature of the present invention resides in preparing on one printer an individual ticket for each item on an invoice simultaneously with the preparation of the invoice on a control printer. As each item is typed on the invoice by printer 11, a similar record is made on the ticket in printer 13, said latter record being centrally spaced on the ticket. Then, as the type carriage of the control printer 11 approaches the end of the line, the bar 87 (Fig. 6) carried by the type carriage, functions to close the switch 86, which initiates circuit operations which, as will hereinafter appear, will cause the transmission to printer 13 of the latest number set up in the switches U, T, H, TH, and TTH, plus a carriage return signal and a predetermined number of line feed signals in order to advance the form or ticket used in printer 13 to the desired or centralized position.

To achieve this feature of the invention, the control key 12 is operated to its position No. 3 whereupon its contacts 51 and 52 will be closed and its contacts 55 and 56 will be opened. In this condition of operation of control key 12, the relay C9 will become energized over the circuit extending from battery, through the winding of relay C9, over conductor 59 and through the contact 57 of control key 12 to ground. Relay C9 upon operating will open its contact 62, thus preventing the operation of the numbering advance key 22. The relay C9, when operated, also opens its contact 46 and closes its contact 61 to cut the printers 14 and 15 out of the line circuit and placing the printers 11 and 16 in the circuit with printer 13, since the relay C8 remains unoperated, thereby holding the contacts 39 thereof closed.

With the control key 12 in its position No. 3 the relay C6 becomes operated over a circuit extending from battery, through the winding of relay C6, over conductor 77, through contact 76 of relay C7 (which is not operated at this time), then over conductor 75, and through the contact 52 of control key 12, to ground. The operation of relay C6 prepares a circuit for relay C10 through contact 81 of relay C6 which has become closed. However, relay C10 will become operated only when the switch 86 is closed upon the arrival of bar 87 (Fig. 6) at a position approximately near the end of the line to operate through spring arm 88 the button 89 to close the switch 86, whereupon (and whenever this occurs) the circuit will be completed from ground (Fig. 3) through the switch 86 (now closed), over conductor 85, through contact 51, over conductor 84, through contact 81 of relay C6, over conductor 83, and through the winding of relay C10 to battery.

Since a new number has not been set up in the numbering switches, the switch arms 91 and 92 of switch A are in their positions whereat they engage contacts 93 and 94 respectively.

Assuming that an item has been printed on the requisition printer 13 and also on the invoice printer 11, the type carriage of printer 11 which carries the contact bar 87 will, when it reaches substantially the end of the line which is determined by a normal length of item information, close contacts 86 and thus relay C10 will become energized over the previously described circuit. Relay C10 becomes locked up over a circuit extending from battery, through the winding of relay C10, through contact 336 of relay C10 (now closed), over conductor 337, through contact 338 (now closed), of relay C5 (Fig. 2), to ground.

Relay C10, upon operating, also closes its contact 339 to complete an operating circuit for relay C8 from battery, through the winding of relay C8, over conductor 341, through contact 339, to ground. Relay C8 remains energized so long as the relay C10 remains operated, and relay C8 also, upon operating, opens its contact 39 and closes its contact 69 thus cutting the printers 11, 16, 14, and 15 out of the circuit, and causing printer 13 alone to remain in the line circuit, the ground for printer 13 being supplied through armature 68, contact 69, and conductor 38 to the relay 37. At this time, relay A1 (Fig. 2) becomes operated over a circuit extending from positive battery, through the winding of relay A1, over conductor 342 to junction 343, then over conductor 345 to contact 346 (now closed) of relay C10, then over conductor 347 and through contact 348 of relay A2 (Fig. 2) to ground. Relay A1 upon operating closes its contact 179 thereby completing an energizing circuit for the stepping magnet 181 of switch B extending from ground, through contact 179, over conductor 182, then through the winding of magnet 181 to positive battery, thereby stepping the switch arms 183 and 184 of switch B to their respective contacts 185 and 186.

As previously described, the numbering circuit has been initiated and the number last set up in the switches U, T, H, TH, and TTH will be retransmitted to the printer 13 under the control of the stepping switch B. After the switch B has been initiated into operation by the operation of its stepping switch 181 through the instrumentality of the contact 179 of relay A1, the stepping of the magnet 181 will be further controlled by the relay C4 of the transmitter 24, over the previously described circuit extending from battery, through the winding of magnet 181 to junction 203, then through contact 185, over switch arm 183, over conductor 204, through contact 141 of relay C4 to ground.

As previously described, the stepping switch B with its switch arms 183 and 184 in their positions 185 and 186, respectively, will cause the blank signal to be transmitted. Thereafter, upon each closure of relay C4 in response to each cyclic operation of the transmitter 24, the S signal will be transmitted when the switch arm 184 engages contact 206, and thereafter as the switch arm 184 successively engages contacts 213, 217, 222, 226, 229, 233, and 236, the signals figures, dash, TTH, TH, T, H, and U digits will be transmitted to the printer 13. When the C4 relay operates at the completion of the units transmission, and the switch arm 184 is stepped to the contact 238, the relay A3 will operate over a circuit extending from battery, through the winding of relay A3 over conductor 239, through contact 238, over switch arm 184 to junction 201, then over conductors 202 and 360 through the contact 94 of switch A, over switch arm 92, then over conductors 104 and 105, through the contact 106 (now closed) of relay A4, to ground. Relay A3, when operated, closes its contacts 242 and 241 and opens its contact 158.

With relay A3 thus operated, a circuit is completed for the start magnet 351 of switch C (Fig. 2) extending from battery, through the winding of start magnet 351, through the normally made contact 352 (similar to contacts 112 and 113 of switch A), over conductor 353, through contact 79 (now closed) of relay C6 (operated when control key 12 was moved to position No. 3), then over conductor 243 and through contact 241 (now closed), to ground. Upon the operation of stepping magnet 351, the switch arm 354 of switch C will be advanced to engage contact 355.

With switch arm 354 of switch C in engagement with contact 355, a circuit is completed for the transmission of the carriage return signal to the printer 13, which circuit extends from ground, through contact 106 (now closed) of relay A4, over conductors 105 and 104, through contact arm 92 of switch A, through contact 94, over conductors 360, 202, and 356, through contact 349 (now closed) of relay C10, over conductor 350, through contact arm 354, through contact 355, over conductor 357, through the winding of CR relay (of the set of code relays 23), then over conductor 117, to battery. The code relay CR upon energizing will pull up its contact 358 to complete a circuit for the energization of relay C3 (associated with transmitter 24, Fig. 1) extending from battery, through the winding of relay C3, over conductor 122, through the contact 358 (now closed) of relay CR, over conductor 119 and through normally closed contact 118 of the transmitter 24, to ground. Upon energization of relay C3, its contact 124 is pulled up, thereby causing the operation of the start magnet 123 of the transmitter distributor 24 which, upon rotation, will transmit a start impulse and impulses in the 1, 2, 3, and 5 positions of the contact associated with the CR relay which signal will be received on the line relay 37 of printer 13. The transmission path from the transmitter 24 extends from battery, over conductor 129, through the contacts 127, through the contacts 1, 2, 3, and 5 of relay CR, then over conductor 209 to junction 211, then over conductor 131 to junction 132, then instead of extending through contact 154 of relay C7 which is now open, the circuit extends from junction 132, over conductor 361, through the contact 73 (now closed) of relay C10 (which is still operated), over conductors 72 and 36, through the winding of line relay 37 of printer 13, over conductor 38, through contact 69, over armature 68, to ground.

When the contact 138 is again closed, in the cyclic rotation of the transmitter 24, the relay C4 (Fig. 1) again operates and closes its contact 141 to complete an operating circuit for the stepping magnet 351 of switch C extending from ground, through contact 141 (now closed), over conductor 204, through switch arm 183 of switch B, through contact 362 of switch B, over conductor 363, through contact 242 (now closed) of relay A3, over conductor 364, through contact 365 (which is closed when the switch arm 354 is in all positions except that shown in Fig. 2), then through the winding of magnet 351 to battery.

The operation of stepping magnet 351 causes the switch arm 354 of the switch C to be stepped to engage its contact 366. It is noted that the contacts 366, 367, 368, 369, 371 and 372 of switch C are strapped together and connected through a common conductor 373 to the line feed (LF) relay of the set of code relays 23, and then through the winding of code line feed relay (LF) and over conductor 117 to battery. The line feed relay (LF) upon operation, closes its contact 374 to complete a circuit from ground, through the contact 118 of the transmitter 24, over conductor 119, through contact 374, over conductor 122 and through the winding of relay C3 to battery. Relay C3 upon operating closes its contact 124 to complete a circuit for the start magnet 123 of the transmitter 24 to transmit the first of a series of line feed signals to the printer 13, which signals are transmitted from battery, through the contacts 127, through the closed contacts of the LF relay, over the conductor 209 to junction 211, over the conductor 131 to junction 132, then over conductor 361, through contact 73 of relay C10, over conductors 72 and 36, through the line relay 37 of printer 13, over conductor 38, through contact 69 and over armature 68 to ground. Switch C, of course, advances one step for each operation of the cam shaft of the transmitter 24 to energize relay C4 whereupon the stepping magnet 351 is energized over a previously described circuit to step the switch arm 364 successively for each line feed signal transmission until the switch arm 354 reaches the contact 372 after the transmission of six successive line feed signals.

After transmitting the series of line feed signals, the switch arm 354 of the switch C is advanced to engage contact 375 to complete a circuit for energizing the relay C5, extending from positive battery (adjacent to relay C6, Fig. 2), over conductor 376, through contact 78 (now closed) of relay C6, over conductor 377, through the relay winding C5, through contact 375, over switch arm 354, over conductor 350, through contact 349 (now closed) of relay C10, over conductors 356, 202, and 360, through contact 94 of switch A, over switch arm 92, then over conductors 104 and 105 and through contact 106 (now closed) of relay A4, to ground. Relay C5 upon operation opens its contact 338 and breaks the locking circuit, previously described, for the relay C10 which thus becomes de-energized and closes its contact 384 and opens its contacts 73, 336, 339, 346, and 349. As soon as relay C10 is de-energized the switches B and C are restored to normal in response to the closing of contact 378 of relay C5. The return magnet 247 of switch B becomes energized over a circuit extending from battery, through the winding of magnet 247, over conductor 248 to junction 249, then over conductor 379 to junction 381, then over conductor 382, through contact 378, over conductor 383, through contact 384 (now closed) of relay C10 to ground, whereupon the switch arms 183 and 184 of switch B are returned to the normal position, as shown in Fig. 2.

The restoring magnet 385 of switch C becomes energized over a circuit extending from battery, through the winding of magnet 385, over conductor 386, to junction 381, then over conductor 382, through contact 378, over conductor 383, through contact 384 (now closed) of relay C10, to ground. With the switches B and C in their normal position and the relay C10 released, the circuit arrangement shown in Figs. 1, 2, and 3 is in readiness for the next closure of the control printer contacts, or the depression of the number advance key 22. The purpose of the function just described is to transmit to the stock requisition ticket printer 13 the number identifying each ticket with the invoice which is being printed on printer 11, and for the printer 13 to receive automatically a carriage return signal and sufficient line feed signals to advance the paper or page to the proper position for printing on the next succeeding ticket.

In the operation of the system according to the present invention, the printer 13 is provided with an attachment as shown in Figs. 7 and 8. As previously mentioned, the printer 13 is of the form and construction shown in U. S. Patent 1,904,164, and having reference to the Figs. 7 and 8 in view of the aforementioned patent the following will be understood more readily. Mounted on the vane frame (identified in said patent by the numeral 7) is a bracket 401 having means 402 for securement to said vane frame. Secured to bracket 401 are a pair of studs 403 for slidably supporting a blocking member 404 having instrumentalities 405 and 406 for blocking the selective operation of the line feed function lever 407 and the carriage return lever 408.

Bracket 401 is further provided with a vertically disposed integral portion 409 adapted to pivotally support on a pivot 411 a swivel 412, one end 413 of which cooperates with the blocking lever 404. The other end of swivel 412 is provided with prongs 414 and 415 which cooperate with a laterally directed portion 416 of a bell crank lever 417 mounted on the selector bell crank retaining bar 418, analogous to the retaining bar 53 shown in Fig. 1 of said Patent No. 1,904,164. The bell crank 417 is normally biased in a counterclockwise direction by a spring 419 against a stop 421 carried on the retaining bar 418. When the type carriage which carries the bar 418 is returned to its leftward position, Fig. 8, which is indicative of its beginning of line position, the lateral portion 416 will cooperate with the prong 414 to rotate the swivel 412 counterclockwise about pivot 409 against the action of overcentering spring 422, and in so doing the blocking bar 404 will be actuated rightwardly (as viewed in Fig. 7) to bring the instrumentalities 405 and 406 directly in front of the function levers 407 and 408, thus precluding their selective operation. As the type carriage moves rightwardly in accordance with character spacing operation, the retaining bar 418 moves therewith until a predetermined position is reached wherein the laterally disposed portion 416 cooperates with the prong 415 to rotate, upon further character spacing movement of the retaining bar 418, the swivel 422 clockwise against the upper action of the overcentering spring 422, to bring or actuate the blocking bar 404 leftwardly, as viewed in Fig. 7, to bring the instrumentalities 405 and 406 again clear or free of the function levers 407 or 408, thereby permitting the selective operation thereafter of these two function levers.

When relay A2 operates, it prepares an obvious locking circuit for relay C8, the purpose of which is to maintain relay C8 operated in all positions of switch B to insure transmission of all digits in the event the control key 12 is accidentally shifted.

Although a specific embodiment of the invention has been disclosed in the drawings and described in the specification, it is to be understood that the invention is not limited to such specific embodiment but may be modified and rearranged without departing from the spirit and scope of the invention.

What is claimed is:

1. In a telegraph system, means for transmitting code combinations of impulses including representations of figures, means for initiating the operation of said transmitting means, means effective normally for varying said figure representations in consecutive order for consecutive operations of said initiating means, means independent of said initiating means for repeating a figure representation a variable number of times, and means associated with said independent means for rendering said initiating means ineffective during operation of said independent means.

2. In a telegraph system, means for transmitting code combinations of impulses including representations of figures, means for initiating the operation of said transmitting means, means effective normally for varying said figure representations in consecutive order for consecutive operations of said initiating means, means independent of said initiating means for controlling the repetition of a figure representation, means effective in response to the operation of said independent means for automatically inserting a predetermined number of function code combinations, and means associated with said independent means for rendering said initiating means ineffective during operation of said independent means.

3. In a telegraph system, means for transmitting code combinations of impulses including representations of characters of a predetermined nature, means for initiating the operation of said transmitting means, means for varying said character representations in consecutive order for consecutive operations of said initiating means, a plurality of receivers, a control means comprising a three position control switch whereby said receivers are rendered receptive selectively according to the position of said control switch, and means operable under the control of said control means and independent of said initiating means for repeating a character representation a variable number of times.

4. In a telegraph system, means for transmitting code combinations of impulses including representations of characters of a predetermined nature, means for initiating the operation of said transmitting means, means for varying said character representations in consecutive order for consecutive operations of said initiating means, a plurality of receivers, a control means comprising a three position control switch whereby said receivers are rendered receptive selectively according to the position of said control switch, other means operable under the control of said control means and independent of said initiating means for repeating a character representation a variable number of times, and means effective in response to the operation of said other means for automatically inserting a predetermined number of function code combinations.

5. In a telegraph numbering system, means for transmitting message signals, means for inserting message identification signals comprising a plurality of number controlling switches, a set of number controlling relays cooperatively associated with each of said switches, means normally effective for initiating the operation of said signal inserting means to transmit through said transmitting means identification signals as determined by said switches under the control of said relays, means independent of said initiating means for effecting repetition of an identification signal determined by the condition of said switches and relays, and means effective in response to the operation of said independent means for automatically inserting a predetermined number of function code signals.

6. In a telegraph numbering system, means for transmitting message signals, means for inserting message identification signals comprising a plurality of number controlling switches, a set of number controlling relays cooperatively associated with each of said switches, means normally effective for initiating the operation of said signal inserting means to transmit through said transmitting means identification signals as determined by said switches under the control of said relays, a receiving recorder comprising circuit controlling instrumentalities, means independent of said initiating means and controlled by said instrumentalities for effecting repetition of an identification signal as determined by the condition of said switches and relays, means associated with said independent means for rendering said initiating means ineffective during operation of said independent means, and means effective in response to the operation of said independent means for automatically inserting a predetermined number of function code signals.

RALPH H. HALVORSEN.

REFERENCES CITED

The following references are of record in the file of this patent:

UNITED STATES PATENTS

| Number | Name | Date |
| --- | --- | --- |
| 1,850,177 | Levy | Mar. 22, 1932 |
| 2,193,809 | Dirkes et al. | Mar. 19, 1940 |
| 2,193,812 | Blanton | Mar. 19, 1940 |